United States Patent
Sugi et al.

(10) Patent No.: US 8,593,757 B2
(45) Date of Patent: Nov. 26, 2013

(54) DISK DRIVE SPINDLE MOTOR WITH BEARING MECHANISM FIXED TO BASE RECESSED PORTION USING ADHESIVE AND SHORTER PRESS-FIT REGION

(75) Inventors: Takatoki Sugi, Kyoto (JP); Tomohiro Yoneda, Kyoto (JP); Hiroshi Kobayashi, Kyoto (JP)

(73) Assignee: Nidec Corporation, Kyoto (JP)

( * ) Notice: Subject to any disclaimer, the term of this patent is extended or adjusted under 35 U.S.C. 154(b) by 111 days.

(21) Appl. No.: 13/241,773

(22) Filed: Sep. 23, 2011

(65) Prior Publication Data

US 2012/0092792 A1    Apr. 19, 2012

(30) Foreign Application Priority Data

Oct. 19, 2010    (JP) .................................. 2010-234668

(51) Int. Cl.
- *G11B 19/20*    (2006.01)
- *G11B 25/04*    (2006.01)
- *H02K 7/08*    (2006.01)

(52) U.S. Cl.
USPC ...................................... 360/99.08; 310/67 R (58) Field of Classification Search
USPC .......... 360/98.07, 99.08, 99.04; 310/90, 90.5, 310/67 R
See application file for complete search history.

(56) References Cited

U.S. PATENT DOCUMENTS

| | | | |
|---|---|---|---|
| 5,097,164 A * | 3/1992 | Nakasugi et al. ............... | 310/90 |
| 5,572,381 A | 11/1996 | Stewart | |
| 6,118,198 A | 9/2000 | Hollenbeck et al. | |
| 6,652,324 B2 | 11/2003 | Maiers et al. | |
| 6,771,460 B2 | 8/2004 | Nii et al. | |
| 6,809,898 B1 * | 10/2004 | Prochazka .................. | 360/99.08 |
| 7,012,191 B1 | 3/2006 | Watanabe et al. | |
| 7,088,023 B1 * | 8/2006 | Gomyo et al. ............. | 360/99.08 |
| 7,105,963 B2 | 9/2006 | Ito et al. | |

(Continued)

FOREIGN PATENT DOCUMENTS

| | | |
|---|---|---|
| JP | 07-075275 A | 3/1995 |
| JP | 07-107693 A | 4/1995 |

(Continued)

OTHER PUBLICATIONS

Yoneda et al.: "Base Unit for Use in Storage Disk Drive Apparatus, Spindle Motor Including the Base Unit, and Storage Disk Drive Apparatus Including the Spindle Motor"; U.S. Appl. No. 13/239,497; filed Sep. 22, 2011.

(Continued)

*Primary Examiner* — Craig A. Renner
(74) *Attorney, Agent, or Firm* — Keating & Bennett, LLP (57) ABSTRACT

A spindle motor includes a stationary portion, a bearing mechanism, and a rotating portion. The bearing mechanism is attached to the stationary portion. The stationary portion includes a base portion, a stator, and a wiring. The base portion is arranged to define a portion of a housing of the disk drive apparatus, the housing defining an airtight interior space. The base portion includes a recessed portion defined on a side thereof where the interior space is defined. The recessed portion includes an inner side surface including an adhesion region and a press-fit region. A lower portion of the bearing mechanism is fixed to the adhesion region through an adhesive, and press fitted to the press-fit region. An axial dimension of the adhesion region is arranged to be greater than that of the press-fit region.

12 Claims, 11 Drawing Sheets

(56) References Cited

U.S. PATENT DOCUMENTS

| | | |
|---|---|---|
| 7,144,275 B2 | 12/2006 | Iida |
| 7,254,882 B2 | 8/2007 | Ito et al. |
| 7,684,146 B1 | 3/2010 | Andrikowich et al. |
| 7,757,378 B1 | 7/2010 | Mann et al. |
| 8,120,217 B2 | 2/2012 | Yawata et al. |
| 8,120,872 B2 | 2/2012 | Sekii et al. |
| 2001/0007519 A1* | 7/2001 | Nishio et al. ............... 360/99.08 |
| 2002/0047392 A1* | 4/2002 | Obara ............................ 310/90 |
| 2002/0084704 A1* | 7/2002 | Fukutani et al. ............ 310/67 R |
| 2003/0112551 A1* | 6/2003 | Kull ........................... 360/99.08 |
| 2005/0135003 A1* | 6/2005 | Inoue et al. ................. 360/99.08 |
| 2005/0206255 A1 | 9/2005 | Yoshino et al. |
| 2006/0023339 A1 | 2/2006 | Fukuyama et al. |
| 2006/0281229 A1 | 12/2006 | Koh et al. |
| 2007/0236091 A1* | 10/2007 | Fukushima ................ 360/99.08 |
| 2009/0279816 A1* | 11/2009 | Gomyo et al. ................... 310/90 |
| 2009/0316299 A1 | 12/2009 | Tashiro et al. |
| 2010/0328819 A1* | 12/2010 | Shinji et al. ................... 360/244 |

FOREIGN PATENT DOCUMENTS

| | | | |
|---|---|---|---|
| JP | 07-222386 A | 8/1995 | |
| JP | 07-334967 A | 12/1995 | |
| JP | 11-218128 A | 8/1999 | |
| JP | 2000-209804 A | 7/2000 | |
| JP | 2000-306319 A | 11/2000 | |
| JP | 2001-067775 A | 3/2001 | |
| JP | 2005-057892 A | 3/2005 | |
| JP | 2005-210787 A | 8/2005 | |
| JP | 2006-040423 A | 2/2006 | |
| JP | 2006-100252 A | 4/2006 | |
| JP | 2006-185553 A | 7/2006 | |
| JP | 2006-187145 A | 7/2006 | |
| JP | 2009-110611 A | 5/2009 | |
| JP | 2009-189157 A | 8/2009 | |
| JP | 2010-09644 A | 1/2010 | |
| JP | 2011-114892 A | 6/2011 | |

OTHER PUBLICATIONS

Yawata et al., "Spindle Motor and Storage Disk Drive Apparatus", U.S. Appl. No. 12/849,868, filed Aug. 4, 2010.
Yawata et al., "Spindle Motor and Storage Disk Drive Apparatus", U.S. Appl. No. 13/352,442, filed Jan. 18, 2012.
Yawata et al., "Spindle Motor and Storage Disk Drive Apparatus", U.S. Appl. No. 13/352,445, filed Jan. 18, 2012.
Saichi et al.,"Spindle Motor Having Connecting Mechanism Connecting Lead Wire and Circuit Board, and Storage Disk Drive Having the Same", U.S. Appl. No. 13/029,143, filed Feb. 17, 2011.
Sugi et al.,"Motor Unit and Disk Drive Apparatus", U.S. Appl. No. 13/290,209, filed Nov. 7, 2011.
Sugi et al.,"Spindle Motor, and Disk Drive Apparatus Including the Spindle Motor", U.S. Appl. No. 13/334,620, filed Dec. 22, 2011.
Matsuyama et al., "Spindle Motor, Disk Drive Apparatus, and Method of Manufacturing Spindle Motor", U.S. Appl. No. 13/424,632, filed Mar. 20, 2012.
Watanabe, "Method of Manufacturing Motor, Motor, and Disk Drive Apparatus", U.S. Appl. No. 13/437,103, filed Apr. 2, 2012.
Watanabe et al., "Spindle Motor and Disk Drive Apparatus", U.S. Appl. No. 61/625,128, filed Apr. 17, 2012.
Watanabe et al., "Base Unit, Spindle Motor, and Disk Drive Apparatus", U.S. Appl. No. 61/625,132, filed Apr. 17, 2012.
Yawata, "Spindle Motor, Disk Drive Apparatus, and Method of Manufacturing Spindle Motor",U.S. Appl. No. 13/365,286, filed Feb. 3, 2012.

\* cited by examiner

DISK DRIVE SPINDLE MOTOR WITH BEARING MECHANISM FIXED TO BASE RECESSED PORTION USING ADHESIVE AND SHORTER PRESS-FIT REGION

BACKGROUND OF THE INVENTION

1. Field of the Invention

The present invention relates to a spindle motor, and more specifically to a spindle motor for use in a disk drive apparatus, a disk drive apparatus, and a method of manufacturing the spindle motor.

2. Description of the Related Art

In recent years, in accordance with increased storage density of disks, there has been increased demand for disk drive apparatuses, such as hard disk drives, to control rotation of the disks, movement of heads, and so on with high precision. JP-A 2006-40423 describes a known hard disk drive (HDD). A gas arranged in an interior of this HDD is a low-density gas, such as a helium gas or a hydrogen gas, and the HDD is thereby arranged to achieve a reduction in resistance of the gas against a disk or a head during rotation of a spindle motor. The reduction in the resistance of the gas against the disk or the head contributes to reducing vibration of the disk or the head, enabling highly precise data recording.

A spindle motor (hereinafter referred to simply as a "motor") installed in a disk drive apparatus sometimes has a base portion that defines a portion of a housing of the disk drive apparatus. An interior of the housing is sometimes filled with a helium gas or the like as described in JP-A 2006-40423, and the helium gas or the like tends to diffuse more easily than air. Therefore, in the case where a bearing mechanism is fixed to a through hole defined in the base portion, it may be difficult to ensure sufficient sealing of a region in which the base portion and the bearing mechanism are fixed to each other.

SUMMARY OF THE INVENTION

The preferred embodiments of the present invention have been designed primarily to prevent a leakage of a gas out of an interior of a disk drive apparatus, and also to facilitate an operation of assembling a motor and an adjustment operation.

A spindle motor for use in a disk drive apparatus according to a preferred embodiment of the present invention includes a stationary portion, a bearing mechanism, and a rotating portion. The bearing mechanism is attached to the stationary portion. The rotating portion is supported through the bearing mechanism to be rotatable about a central axis with respect to the stationary portion. The stationary portion includes a base portion, a stator, and a wiring. The stator is fixed to the base portion. The wiring is arranged to extend from coils of the stator. The base portion is arranged to define a portion of a housing of the disk drive apparatus, the housing defining an airtight interior space. The wiring is arranged along a surface of the base portion which faces the interior space. The base portion includes a recessed portion defined on a side thereof where the interior space is defined. The recessed portion includes an inner side surface including an adhesion region and a press-fit region. A lower portion of the bearing mechanism is fixed to the adhesion region through an adhesive, and press fitted to the press-fit region. An axial dimension of the adhesion region is arranged to be greater than an axial dimension of the press-fit region.

A method of manufacturing a spindle motor for use in a disk drive apparatus according to another preferred embodiment of the present invention includes the steps of: a) assembling a stationary portion including a base portion including a recessed portion; b) assembling an assembly including a bearing mechanism and a rotating portion, the bearing mechanism including a shaft portion; c) applying an adhesive preferably possessing at least a thermosetting property to at least one of an inner side surface of the recessed portion of the base portion and an outside surface of a lower portion of the bearing mechanism; d) press fitting the lower portion of the bearing mechanism to the recessed portion to temporarily fix the bearing mechanism to the base portion; e) measuring a perpendicularity of the shaft portion of the bearing mechanism with respect to the base portion, and determining whether the perpendicularity falls within a predetermined allowable range; f) if step e) determines that the perpendicularity deviates from the predetermined allowable range, correcting an inclination of the shaft portion; and g) curing the adhesive to finally fix the bearing mechanism to the base portion. The base portion is preferably arranged to define a portion of a housing of the disk drive apparatus, the housing defining an airtight interior space. In step d), an adhesion region and a press-fit region are defined between the bearing mechanism and the recessed portion, and an axial dimension of the adhesion region is greater than an axial dimension of the press-fit region.

Various preferred embodiments of the present invention achieve prevention of a leakage of a gas out of an interior of a disk drive apparatus, and also facilitates an operation of assembling a motor and an adjustment operation.

The above and other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Figure 1:
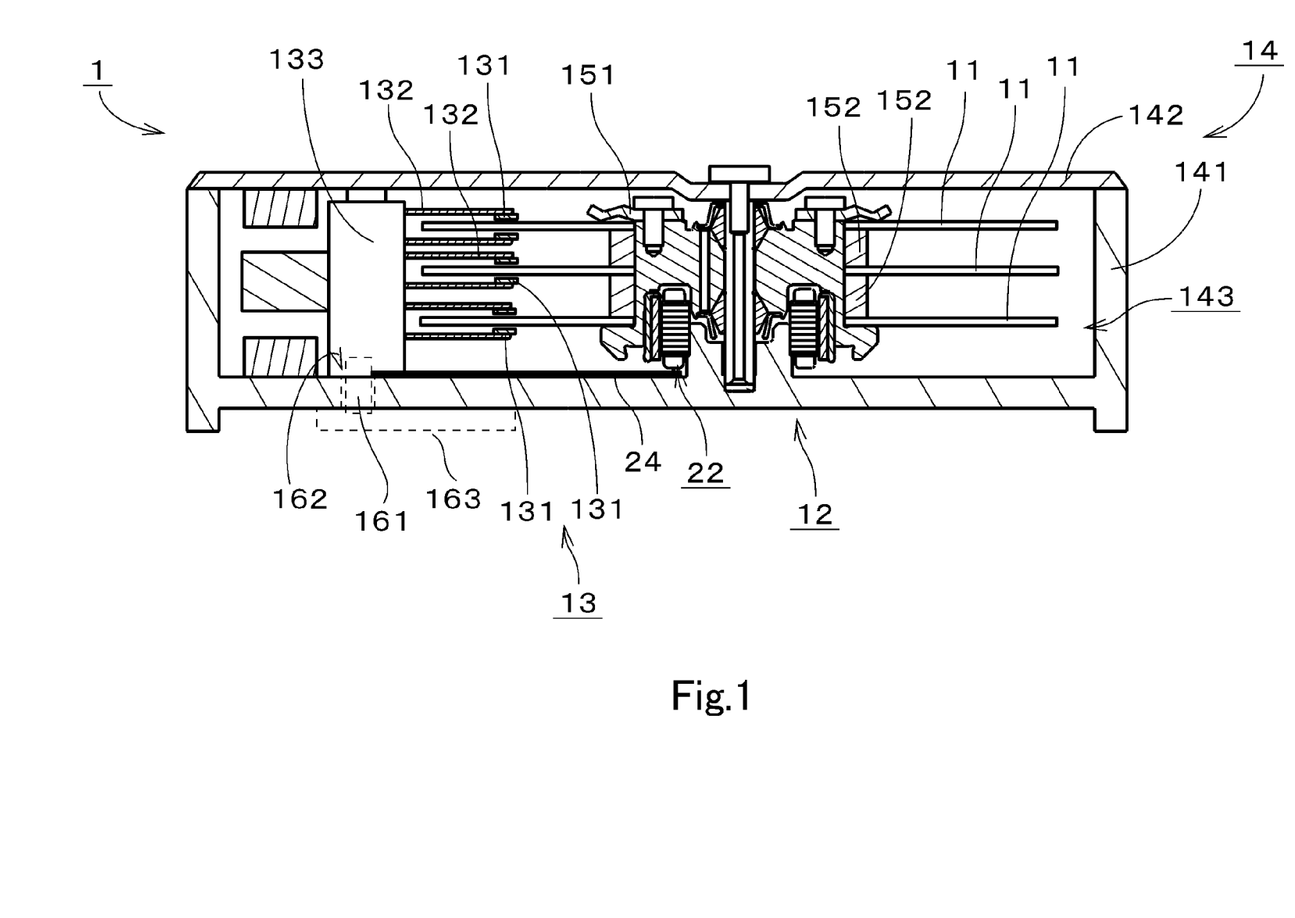
FIG. 1 is a diagram illustrating a disk drive apparatus according to a first preferred embodiment of the present invention.

It is assumed herein that a vertical direction is defined as a direction in which a central axis of a motor extends, and that an upper side and a lower side along the central axis in FIG. 1 are referred to simply as an upper side and a lower side, respectively. It should be noted, however, that the above definitions of the vertical direction and the upper and lower sides should not be construed to restrict relative positions or directions of different members or portions when the motor is actually installed in a device. Also note that directions parallel to or substantially parallel to the central axis are referred to by the term "axial direction", "axial", or "axially", that directions radiating from the central axis are simply referred to by the term "radial direction", "radial", or "radially", and that a circumferential direction about the central axis is simply referred to by the term "circumferential direction", "circumferential", or "circumferentially".

First Preferred Embodiment

FIG. 1 is a vertical cross-sectional view of a disk drive apparatus 1 including a spindle motor (hereinafter referred to simply as a "motor") 12 according to a first preferred embodiment of the present invention. The disk drive apparatus 1 is a so-called hard disk drive. The disk drive apparatus 1 preferably includes, for example, three disc-shaped disks 11, on which information is recorded, the motor 12, an access portion 13, a clamper 151, and a housing 14. The motor 12 is arranged to rotate while holding the disks 11. The access portion 13 is arranged to read and/or write information from or to the disks 11. Note that the number of disks 11 may be any other desirable number other than three.

The housing 14 preferably includes a first housing member 141, which is in the shape of a box without a lid, and a second housing member 142, which is in the shape of a substantially flat plate. The disks 11, the motor 12, the access portion 13, and the clamper 151 are contained in the housing 14. The first housing member 141 and the second housing member 142 are joined to each other through, for example, welding or by other methods to define the housing 14 of the disk drive apparatus 1. An interior space 143 of the housing 14 is hermetically enclosed, and includes no or substantially no dirt or dust. The interior space 143 of the housing 14 is preferably filled with a gas that is less dense than air, such as, for example, a helium gas.

The three disks 11 are arranged at regular intervals in an axial direction through spacers 152, and clamped to the motor 12 through the clamper 151. The access portion 13 preferably includes six heads 131, six arms 132 each of which is arranged to support a separate one of the heads 131, and a head actuator mechanism 133. Each of the heads 131 is arranged to magnetically read and/or write information from or to a corresponding one of the disks 11 while being arranged in close proximity to the disk 11. The head actuator mechanism 133 is arranged to move each of the arms 132 to move an associated one of the heads 131 relative to a corresponding one of the disks 11. The head 131 is thereby arranged to access a desired location on the rotating disk 11 while being arranged in close proximity to the disk 11, to carry out the reading and/or writing of the information.

Figure 2:
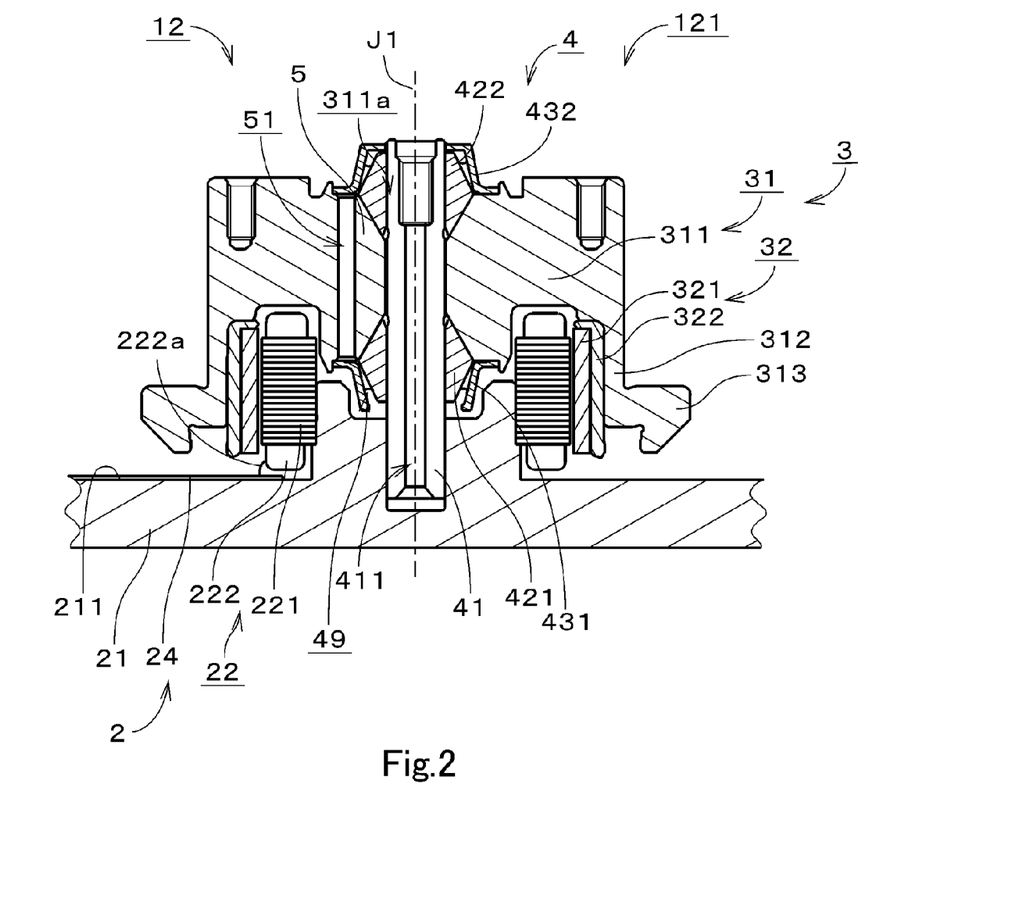
FIG. 2 is a diagram illustrating a motor according to the first preferred embodiment of the present invention.

FIG. 2 is a vertical cross-sectional view of the motor 12. The motor 12 is an outer-rotor motor. The motor 12 includes a stationary portion 2, which is a stationary assembly, a rotating portion 3, which is a rotating assembly, and a fluid dynamic bearing mechanism 4 (hereinafter referred to as the "bearing mechanism 4"). The bearing mechanism 4 is attached to the stationary portion 2. The rotating portion 3 is supported through the bearing mechanism 4 to be rotatable about a central axis J1 of the motor 12 with respect to the stationary portion 2. The central axis J1 of the motor 12 coincides with central axes of the stationary portion 2, the rotating portion 3, and the bearing mechanism 4.

The stationary portion 2 preferably includes a base plate 21, which is an example base portion, an annular stator 22, and a wiring 24. The base plate 21 is arranged to define a portion of the first housing member 141 illustrated in FIG. 1. The stator 22 is fixed to a circumference of a cylindrical holder of the base plate 21. The stator 22 preferably includes a stator core 221 and coils 222, which are wound on the stator core 221. The wiring 24 is arranged along an inner bottom surface 211 of the base plate 21, that is, along a surface of the housing 14 which faces the interior space 143 illustrated in FIG. 1. The wiring 24 is arranged to extend away from the coils 222 toward a connector 161, which is represented by a broken line in FIG. 1. One end portion of the wiring 24 is connected to the connector 161, while the other end portion thereof is connected to lead wires 222a drawn from the coils 222 as illustrated in FIG. 2. Examples of the wiring 24 include, for example, a flexible printed circuit board (FPC). The wiring 24 may be continuous with the lead wires 222a.

The base plate 21 preferably includes only a single through hole 162 defined therein as represented by a broken line in FIG. 1. The connector 161 is arranged in the through hole 162. The through hole 162 is sealed with the connector 161 and an adhesive or other suitable material. The connector 161 is connected to an external circuit 163 outside of the housing 14.

Referring to FIG. 2, the rotating portion 3 includes a rotor hub 31 and a magnetic member 32. The rotor hub 31 includes a hub body 311, a cylindrical portion 312, and a disk mount portion 313. The cylindrical portion 312 is arranged to project downward from an outer edge portion of the hub body 311. The disk mount portion 313 is arranged to extend radially outward from a bottom portion of the cylindrical portion 312. The magnetic member 32 preferably includes a substantially cylindrical rotor magnet 321 and a back iron 322. The rotor magnet 321 is fixed to an inside of the cylindrical portion 312 with the back iron 322 arranged therebetween. The rotor magnet 321 is arranged radially opposite the stator 22. A torque is generated between the stator 22 and the rotor magnet 321.

The hub body 311 includes a hole portion 311a extending in the axial direction defined in a center thereof. A portion 5 of the hub body 311 which is in the vicinity of the central axis J1 and includes the hole portion 311a will be hereinafter referred to as a "sleeve portion 5". The sleeve portion 5 includes a communicating hole 51 extending therethrough in the axial direction and defined in the vicinity of the hole portion 311a.

The bearing mechanism 4 preferably includes a shaft 41, a first cone portion 421, a second cone portion 422, a first cover member 431, a second cover member 432, and a lubricating oil 49. The shaft 41, which defines a shaft portion of the bearing mechanism 4, is inserted in the hole portion 311a of the sleeve portion 5. In addition, the shaft 41 is fixed to the base plate 21 so that the shaft 41 is arranged to be stationary and extend in the vertical direction along the central axis J1. The shaft 41 preferably includes a through hole 411 arranged to extend along the central axis J1. The first cone portion 421 is fixed to the shaft 41 on a lower side of the sleeve portion 5. An upper portion of an outside surface of the first cone portion 421 is arranged to be angled radially outward with decreasing height, while a lower portion of the outside surface of the first cone portion 421 is arranged to be angled radially outward with increasing height. The second cone portion 422 is fixed to the shaft 41 on an upper side of the sleeve portion 5. As with the first cone portion 421, an upper portion of an outside surface of the second cone portion 422 is arranged to be angled radially outward with decreasing height, while a lower portion of the outside surface of the second cone portion 422 is arranged to be angled radially outward with increasing height.

Figure 3:
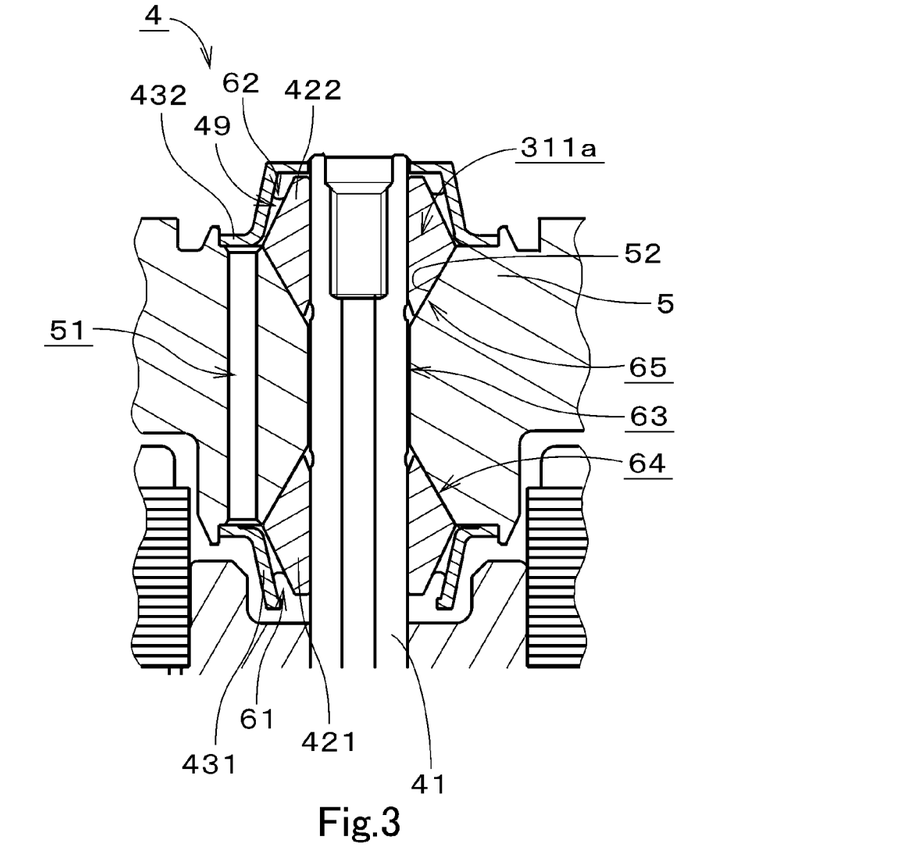
FIG. 3 is a diagram illustrating a bearing mechanism according to the first preferred embodiment of the present invention.

FIG. 3 is a diagram illustrating the bearing mechanism 4 in an enlarged form. A lower portion of an inside surface 52 of the hole portion 311a of the sleeve portion 5 is arranged to be angled radially outward with decreasing height, while an upper portion of the inside surface 52 is arranged to be angled radially outward with increasing height.

The first cover member 431 is attached to a bottom portion of the sleeve portion 5, and is arranged opposite to the outside surface of the first cone portion 421. The second cover member 432 is attached to a top portion of the sleeve portion 5, and is arranged to cover the outside surface and an upper end of the second cone portion 422. In the bearing mechanism 4, the lubricating oil 49 is provided in a gap 61 between the first cover member 431 and the first cone portion 421, and a gap 62 between the second cover member 432 and the second cone portion 422.

A first inclined gap 64, which is arranged to be angled radially outward with decreasing height, is defined between the lower portion of the inside surface 52 of the sleeve portion 5 and the upper portion of the outside surface of the first cone portion 421. A second inclined gap 65, which is arranged to be angled radially outward with increasing height, is defined between the upper portion of the inside surface 52 of the sleeve portion 5 and the lower portion of the outside surface of the second cone portion 422.

While the motor 12 is driven, a fluid dynamic pressure is generated through the lubricating oil 49 in each of the first inclined gap 64 and the second inclined gap 65. The sleeve portion 5 is thereby supported to be rotatable with respect to the shaft 41. The lubricating oil 49 is arranged to fill a radial gap 63, which is defined between the shaft 41 and a middle portion of the sleeve portion 5, the first inclined gap 64, the communicating hole 51, and the second inclined gap 65.

In the motor 12, the sleeve portion 5 is arranged to define a portion of the bearing mechanism 4 as a portion supported by the shaft 41. That is, the sleeve portion 5 is a portion of the rotating portion 3 and a portion of the bearing mechanism 4 at the same time.

Figure 4:
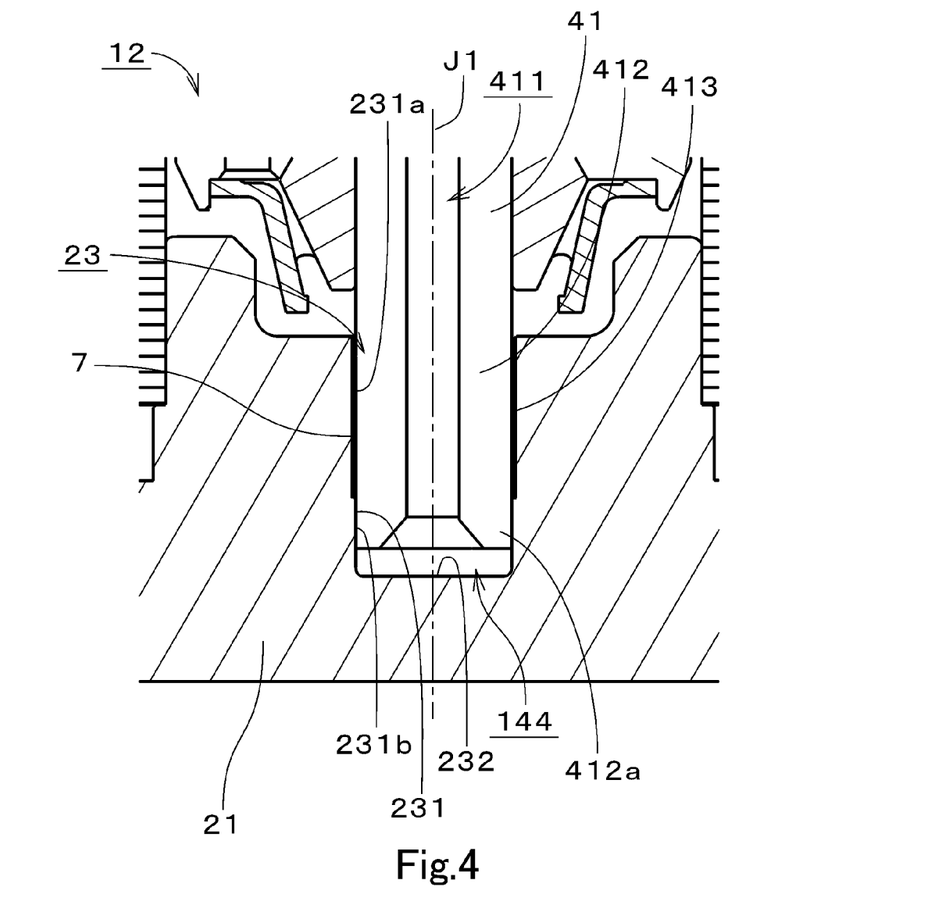
FIG. 4 is a diagram illustrating a lower portion of a shaft of the motor and its vicinity in an enlarged form.

FIG. 4 is a diagram illustrating a lower portion 412 of the shaft 41 of the motor 12 and its vicinity in an enlarged form. The base plate 21 includes a recessed portion 23 recessed downward defined therein. More specifically, the recessed portion 23 is defined on an upper side (in FIG. 4) of the base plate 21, that is, on a side thereof where the interior space 143 illustrated in FIG. 1 is defined. The lower portion 412 of the shaft 41 is fixed inside the recessed portion 23 through adhesion and press fitting. Specifically, an opening-side region 231a of an inner side surface 231 of the recessed portion 23 and a portion of the lower portion 412 of the shaft 41 are adhered to each other. The region 231a is preferably a cylindrical region centered on the central axis J1. A thermosetting adhesive 7 is preferably used for this adhesion. Hereinafter, the region 231a will be referred to as the "adhesion region 231a". Meanwhile, a region 231b on a lower side of the adhesion region 231a has a diameter slightly smaller than that of the adhesion region 231a, and a lower end portion 412a of the shaft 41, which is an end portion of the lower portion 412 of the shaft 41, is press fitted to the region 231b. The region 231b is preferably a cylindrical region centered on the central axis J1. Hereinafter, the region 231b will be referred to as the "press-fit region 231b".

Note that the adhesion region may not necessarily be arranged to extend up to an opening end of the recessed portion 23, and that an opening-end portion of the recessed portion 23 may not necessarily be provided with the adhesive 7. Also note that the press-fit region may not necessarily be continuous with the adhesion region.

As illustrated in FIG. 4, the lower end portion 412a of the shaft 41 is arranged to be spaced from a bottom surface 232 of the recessed portion 23. A space 144 enclosed by the lower end portion 412a of the shaft 41 and the inner side surface 231 and the bottom surface 232 of the recessed portion is arranged to be in communication with the interior space 143 of the housing 14 illustrated in FIG. 1 through the through hole 411 defined in the shaft 41.

The axial dimension of the press-fit region 231b is preferably in the range of about 10% to about 50% of the axial dimension of the adhesion region 231a, for example. The distance between the adhesion region 231a and an outside surface 413 of the lower portion 412 of the shaft 41 is preferably in the range of about 20 μm to about 40 μm, and more preferably in the range of about 25 μm to about 35 μm, for example. An interference, i.e., a difference between the radius of the outside surface 413 of the shaft 41 and the radius of the press-fit region 231b before the shaft 41 is fixed to the recessed portion 23, is preferably in the range of about 2 μm to about 20 μm, and more preferably in the range of about 5 μm to about 15 μm, for example.

Figure 5:
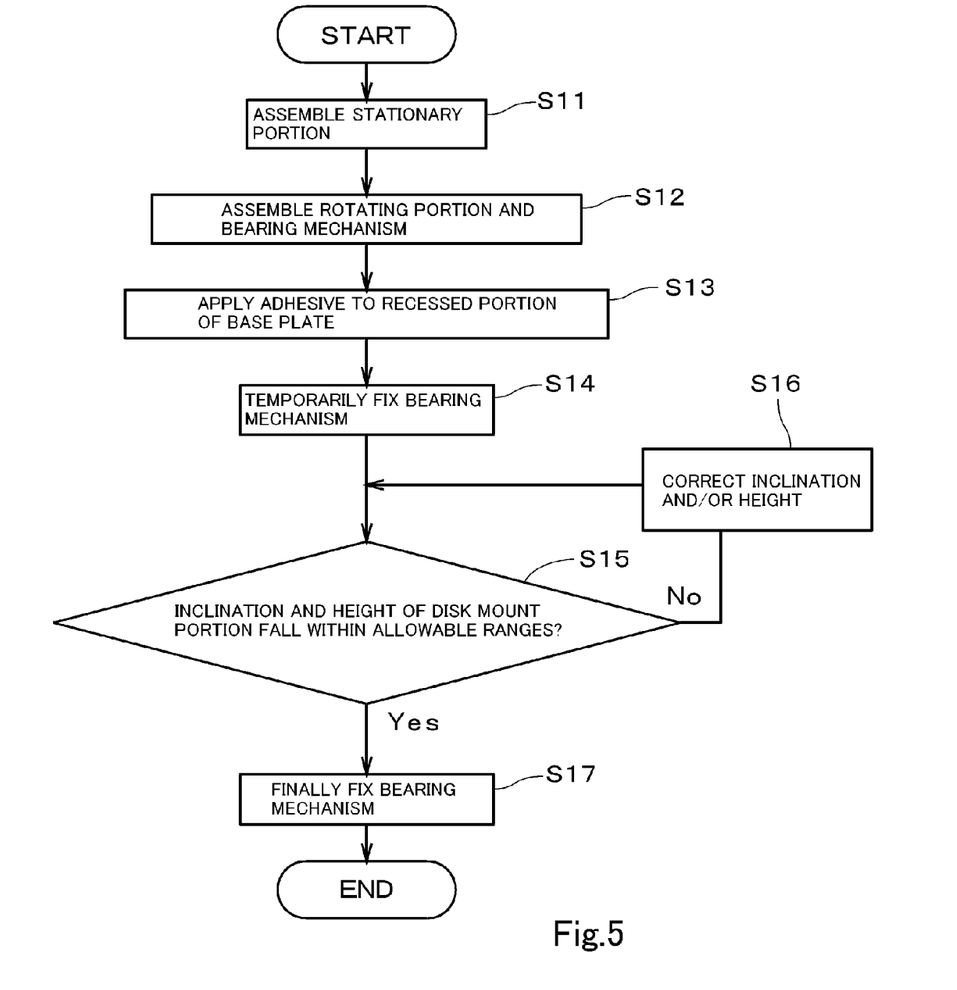
FIG. 5 is a flowchart illustrating a flow of assemblage of the motor.
Figure 6:
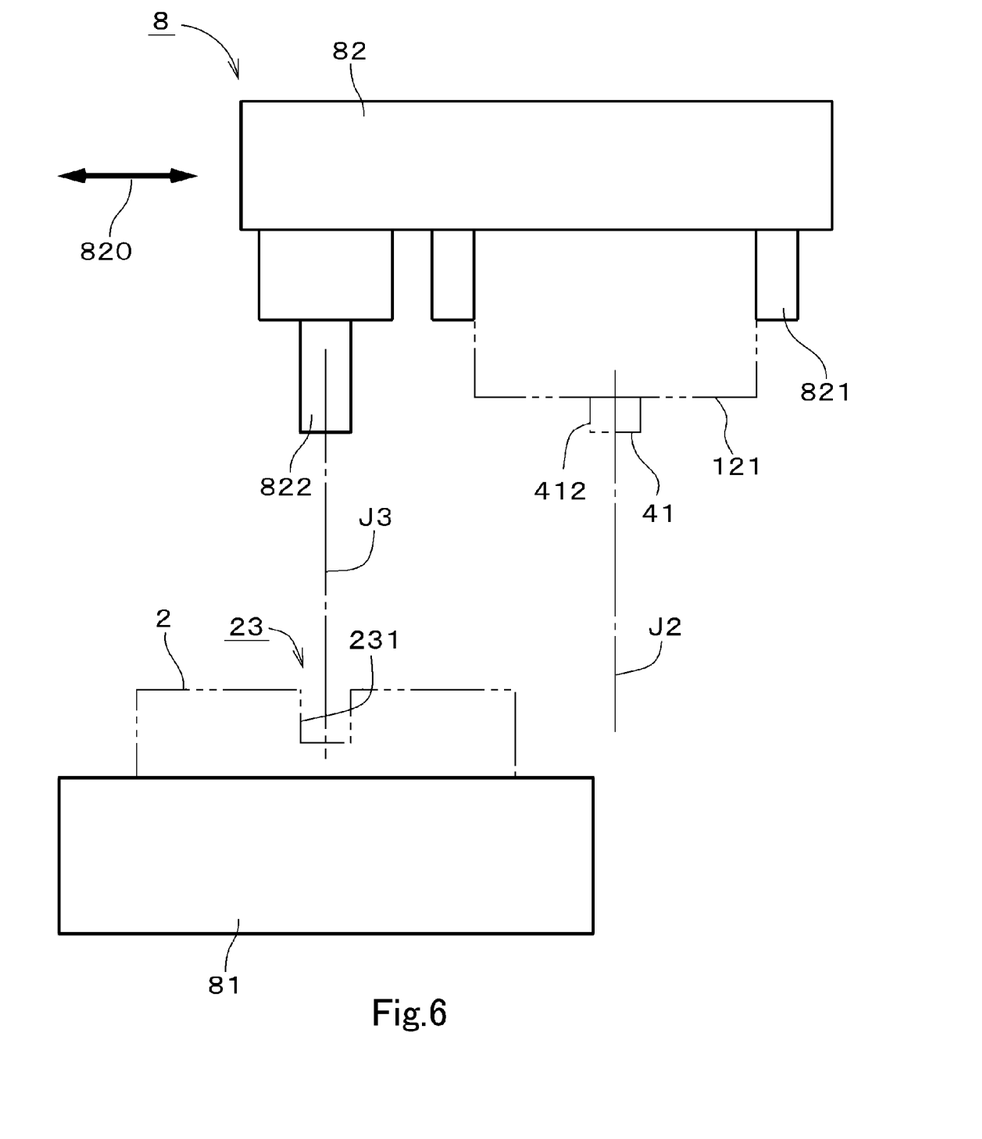
FIG. 6 is a diagram illustrating an assembly fitting apparatus according to the first preferred embodiment of the present invention.

FIG. 5 is a flowchart illustrating a flow of assemblage of the motor 12. First, the stationary portion 2 illustrated in FIG. 2 is assembled, and the rotating portion 3 and the bearing mechanism 4 are assembled as a single assembly 121 (steps S11 and S12). The assemblage of the stationary portion 2 may be carried out after or in parallel with the assemblage of the assembly 121. The same holds true for other preferred embodiments of the present invention described below. FIG. 6 is a diagram illustrating the structure of an assembly fitting apparatus 8 in a simplified form. In FIG. 6, chain double-dashed lines represent contours of the stationary portion and the assembly 121, which includes the rotating portion 3 and the bearing mechanism 4. In the assembly fitting apparatus 8, the stationary portion 2 is mounted on a stage 81. A position shifting mechanism 82, which is arranged to be movable in both vertical and horizontal directions, is arranged over the stage 81. The position shifting mechanism 82 includes a chuck 821 arranged to hold the assembly 121. A pin 822 is fixed to the position shifting mechanism 82. The pin 822 has the same diameter as that of the recessed portion 23 of the base plate 21 of the stationary portion 2.

When the assembly 121 is fixed to the stationary portion 2, the position of the stationary portion 2 is first adjusted so that the pin 822 is located substantially over the recessed portion 23. Next, the position shifting mechanism 82 is shifted downward so as to insert the pin 822 into the recessed portion 23, so that a central axis of the pin 822 and a central axis J3 of the recessed portion 23 coincide with each other with excellent precision.

After the alignment of the pin 822 and the recessed portion 23 is complete, the position shifting mechanism 82 is shifted upward. Since the assembly 121 and the pin 822 are movable in the horizontal direction as indicated by an arrow 820, the assembly 121 is moved to the exact position where the pin 822 is located before this position shift. As a result, a central axis J2 of the shaft 41 of the assembly 121 substantially coincides with the central axis J3 of the recessed portion 23. The thermosetting adhesive 7 is applied to a portion of the inner side surface 231 of the recessed portion 23 which is in the vicinity of the opening end of the recessed portion 23 (step S13). Then, the position shifting mechanism 82 is shifted downward so as to insert the lower portion 412 of the shaft 41, which is a lower portion of the bearing mechanism 4, into the recessed portion 23.

Figure 7:
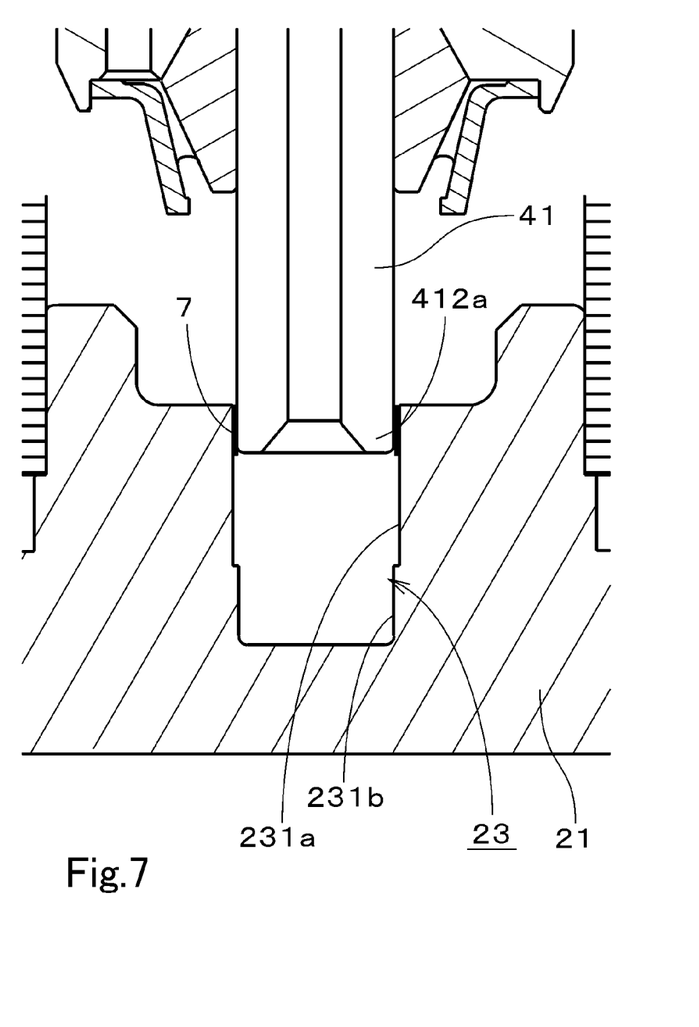
FIG. 7 is a diagram illustrating a portion of the motor in course of assemblage of the motor.

Referring to FIG. 7, at this time, as a result of the movement of the shaft 41, the adhesive 7 is spread on the adhesion region 231a, and further the lower end portion 412a of the shaft 41 is press fitted to the press-fit region 231b. In other words, as a result of the insertion of the shaft 41 into the recessed portion 23, an adhesion region where the adhesive 7 exists between the shaft 41 and the recessed portion 23 is defined, and a press-fit region where the shaft 41 is arranged to be in contact with the inner side surface 231 of the recessed portion 23 is defined. Note that, in FIG. 7, a difference in diameter between the adhesion region 231a and the press-fit region 231b is exaggerated. The same holds true for FIG. 10 described below.

The adhesive 7 serves as a lubricant to facilitate the insertion of the shaft 41. Note that a portion of the adhesive 7 may be spread into the press-fit region 231b. The same holds true for other preferred embodiments of the present invention described below. As a result of the shaft 41 being press fitted to the recessed portion 23, the bearing mechanism 4 is temporarily fixed to the base plate 21 (step S14).

Next, in a situation where the bearing mechanism 4 is temporarily fixed to the stationary portion 2, the inclination and the height of the disk mount portion 313 of the rotating portion 3 with reference to the base plate 21 are measured. The measurement of the inclination of the disk mount portion 313 corresponds to measurement of the perpendicularity of the shaft 41 with respect to the base plate 21.

Then, it is determined whether each of the inclination and the height of the disk mount portion 313 fall within a predetermined allowable range, that is, whether each of the perpendicularity of the shaft 41 and the height of the lower end portion 412a of the shaft 41 falls within a predetermined allowable range (step S15). If both the inclination and the height of the disk mount portion 313 fall within their respective predetermined allowable ranges, the stationary portion 2 and the assembly 121 are carried into a heating device, and the base plate 21 is heated to cure the adhesive 7. As a result of the curing of the adhesive 7, the shaft 41 is finally fixed to the recessed portion 23 (step S17). This ensures a sufficient strength with which the assembly 121 and the base plate 21 are joined to each other.

If either the inclination or the height of the disk mount portion 313 deviates from the predetermined allowable range, that is, if either the perpendicularity or the axial position of the shaft 41 deviates from the predetermined allowable range, the inclination and/or the height of the disk mount portion 313 are corrected so that both the inclination and the height of the disk mount portion 313 with reference to the base plate 21 fall within their respective predetermined allowable ranges (step S16). As a result, the perpendicularity and/or the axial position of the shaft 41 are corrected. If it is confirmed by another measurement that both the inclination and the height of the disk mount portion 313 fall within their respective predetermined allowable ranges (step S15), the base plate 21 is heated by the heating device to cure the adhesive 7. As a result of the curing of the adhesive 7, the bearing mechanism 4 is finally fixed to the recessed portion 23 (step S17). An operation of assembling the motor 12 is completed after the above-described flow of steps.

The structure of the motor 12 according to the first preferred embodiment and the operation of assembling the motor 12 have been described above. It is preferable that an interior of the disk drive apparatus 1 should be filled with a gas that is less dense than air, such as, for example, helium gas, which has an extremely small molecule size and a large diffusion coefficient. In the case of a motor in which a shaft is fixed to a through hole defined in a base portion, it is not easy to ensure sufficient sealing of a gap between the shaft and the through hole. In contrast, the shaft 41 of the motor 12 is fixed to the recessed portion 23, i.e., a non-through hole portion, of the base plate 21, and therefore, a leakage of the helium gas is prevented. Since the helium gas is sealed in the disk drive apparatus 1, improvements in reliability and durability of the disk drive apparatus 1 are achieved.

During the assemblage of the motor 12, the shaft 41 is temporarily fixed to the base plate 21 through press fitting. This eliminates a need to use a large-scale jig to fix relative positions of the stationary portion 2 and the assembly 121 in the heating device as would be required if the shaft 41 and the base plate 21 were to be fixed to each other through only the adhesive. This in turn facilitates the operation of assembling the motor 12.

Because the axial dimension of the adhesion region 231a between the shaft 41 and the recessed portion 23 is arranged to be greater than that of the press-fit region 231b, an adjustment operation of adjusting the height and/or inclination of the disk mount portion 313 with reference to the base plate 21 before the curing of the adhesive 7 can be easily carried out. Furthermore, because the shaft 41 is arranged to be spaced from the bottom surface 232 of the recessed portion 23, a vertical shift or an inclination of the shaft 41 would not lead to a contact of the lower end portion 412a with the bottom surface 232. This enables the adjustment operation of adjusting the height and/or inclination of the disk mount portion 313 to be accomplished with excellent precision.

The recessed portion 23 has only one press-fit region 231b. In other words, the inner side surface 231 of the recessed portion 23 is not provided with two or more press-fit regions spaced from each other in the vertical direction. This facilitates the adjustment operation for the rotating portion 3. Because the adhesion region 231a, which has a comparatively large diameter, is arranged on a side of the press-fit region 231b closer to the opening end of the recessed portion 23, it is easy to define the recessed portion 23 by a cutting process or the like.

Regarding the bearing mechanism 4, when the shaft 41 is inserted into the recessed portion 23, an air within the space 144 enclosed by the shaft 41 and the recessed portion 23 is discharged through the through hole 411 of the shaft 41. This contributes to preventing an excessive increase in air pressure in the space 144. Moreover, it is possible to remove the air from the space 144 through the through hole 411 when the helium gas is filled into an interior of the housing 14.

Note that a hydrogen gas, instead of the helium gas, may be used as the gas filled into the interior of the housing 14. Also note that a mixture of the helium gas and the hydrogen gas may be used as the gas filled into the interior of the housing 14. Also note that a mixture of an air and any one of the helium gas, the hydrogen gas, and the mixture of the helium gas and the hydrogen gas may be used as the gas filled into the interior of the housing 14. The same holds true for other preferred embodiments of the present invention described below. The aforementioned technique of removing the air from the space 144 through the through hole 411 is especially preferable in the case where the helium gas, the hydrogen gas, or the mixture of the helium gas and the hydrogen gas is filled into the interior space 143 of the housing 14.

In the assemblage of the motor 12, the adhesive 7 may be applied to the outside surface 413 of the shaft 41, or to both the outside surface 413 of the shaft 41 and the inner side surface 231 of the recessed portion 23. In short, the adhesive 7 is applied preferably to at least one of the outside surface 413 of the shaft 41 and the inner side surface 231 of the recessed portion 23.

The adhesive 7 preferably is a thermosetting adhesive. Preferably, the adhesive 7 is an epoxy thermosetting adhesive. In this case, the adhesive 7 is able to fix the shaft 41 and the base plate 21 to each other with a greater joint strength than in the case where the adhesive 7 possesses only an anaerobic property or only a UV-curing property. A variety of adhesives that possess the anaerobic property and/or the UV-curing property may be used in the motor 12, as long as the adhesives possess a thermosetting property. The same holds true for other preferred embodiments of the present invention described below.

Second Preferred Embodiment

Figure 8:
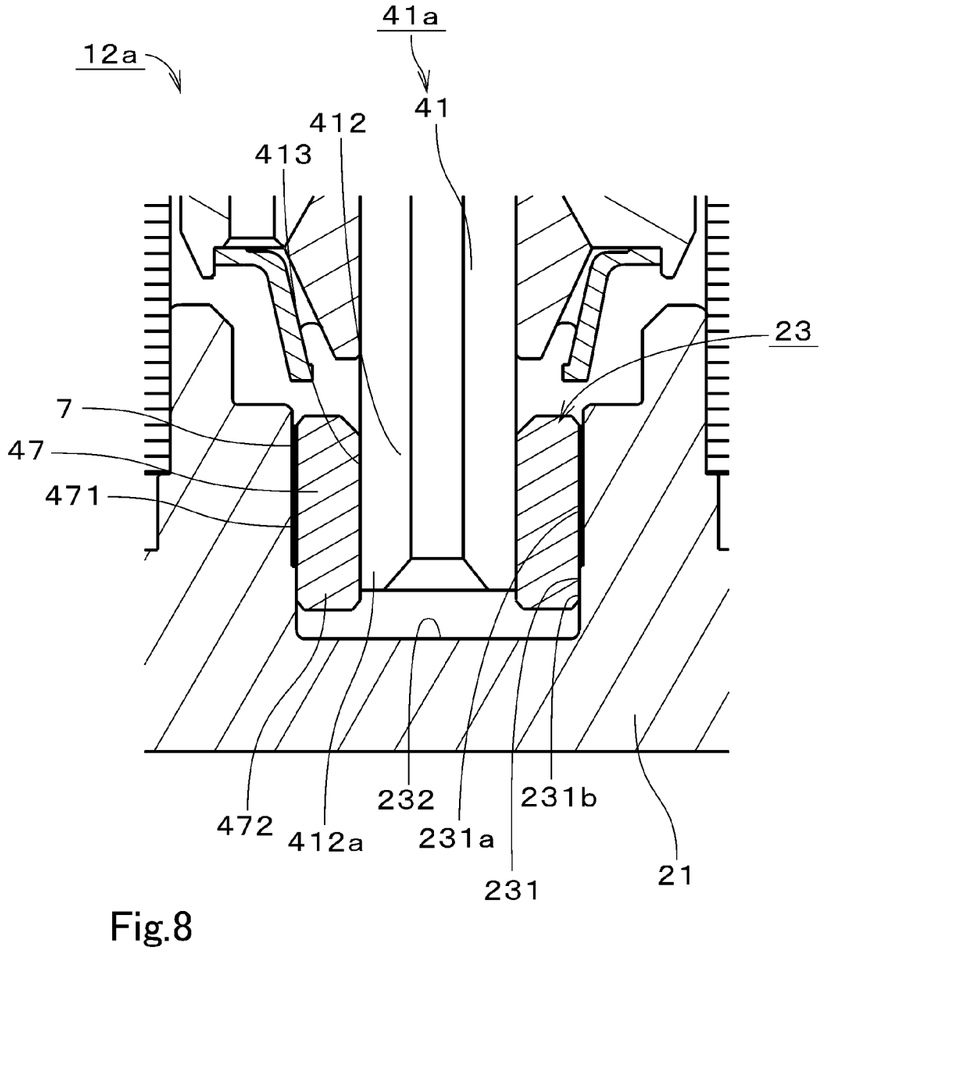
FIG. 8 is a diagram illustrating a lower portion of a shaft portion of a motor and its vicinity according to a second preferred embodiment of the present invention in an enlarged form.

FIG. 8 is a diagram illustrating a portion of a motor 12a according to a second preferred embodiment of the present invention in an enlarged form. In the motor 12a, a cylindrical annular member 47 is fixed to the outside surface 413 of the lower portion 412 of the shaft 41. Hereinafter, the shaft 41 and the annular member 47 will be referred to collectively as a "shaft portion 41a". The structure of the motor 12a is otherwise similar to that of the motor 12 according to the first preferred embodiment. Accordingly, like members or portions are designated by like reference numerals, and redundant description is omitted.

The base plate 21 includes the recessed portion 23 defined therein. The annular member 47 is fixed to the adhesion region 231a of the inner side surface 231, which is arranged near the opening end of the recessed portion 23, and the press-fit region 231b of the inner side surface 231, which is arranged on the lower side of the adhesion region 231a, through adhesion and press fitted, respectively. The lower end portion 412a of the shaft 41 and a lower end portion 472 of the annular member 47, that is, a lower end portion of the shaft portion 41a, are arranged to be spaced from the bottom surface 232 of the recessed portion 23.

A flow of assembling the motor 12a is substantially similar to the flow of assembling the motor 12 according to the first preferred embodiment. Specifically, first, the stationary portion 2 is assembled, and the rotating portion 3 and the bearing mechanism 4 are assembled as the single assembly 121 (steps S11 and S12). During the assemblage of the assembly 121, the annular member 47 is fixed to the shaft 41 through press fitting.

Next, the thermosetting adhesive 7 is applied to the inner side surface 231 of the recessed portion 23 of the base plate 21 after the base plate 21 is mounted on the stage 81 of the assembly fitting apparatus 8 as illustrated in FIG. 6 (step S13). Note that the adhesive 7 may be applied to an outside surface 471 of the annular member 47 or to both the outside surface 471 and the inner side surface 231.

The assembly 121 is moved toward the stationary portion 2 by use of the position shifting mechanism 82 so that the annular member 47 and the lower portion 412 of the shaft 41, which define the lower portion of the bearing mechanism 4, are inserted into the recessed portion 23. At this time, the lower end portion 472 of the annular member 47 is press fitted to the press-fit region 231b, so that the bearing mechanism 4 is temporarily fixed to the base plate 21 (step S14).

Next, it is determined whether each of the inclination and the height of the disk mount portion 313 of the rotating portion 3 falls within the predetermined allowable range (step S15). If both the inclination and the height of the disk mount portion 313 fall within their respective predetermined allowable ranges, the bearing mechanism 4 is finally fixed to the base plate 21 (step S17). If either the inclination or the height of the disk mount portion 313 deviates from the predetermined allowable range, the inclination and/or the height of the disk mount portion 313 are corrected (step S16), and after it is confirmed that both the inclination and the height of the disk mount portion 313 fall within their respective predetermined allowable ranges, the bearing mechanism 4 is finally fixed to the base plate 21 (steps S15 and S17).

Also in the second preferred embodiment, since the shaft portion 41a is fixed to the recessed portion 23, a leakage of the, for example, helium gas filled into the interior of the disk drive apparatus 1 is prevented. Provision of the annular member 47 in the motor 12a makes it possible to increase the diameter of the recessed portion 23 of the base plate 21. An increase in the diameter of the recessed portion 23 makes it possible to apply a larger amount of the adhesive 7 to the adhesion region 231a, and to thereby improve the strength with which the bearing mechanism 4 and the base plate 21 are joined to each other. The temporary fixing of the stationary portion 2 and the assembly 121 to each other facilitates an operation of assembling the motor 12a. Because the axial dimension of the adhesion region 231a is arranged to be greater than that of the press-fit region 231b, an adjustment operation of adjusting the height and/or inclination of the disk mount portion 313 can be easily carried out.

Third Preferred Embodiment

Figure 9:
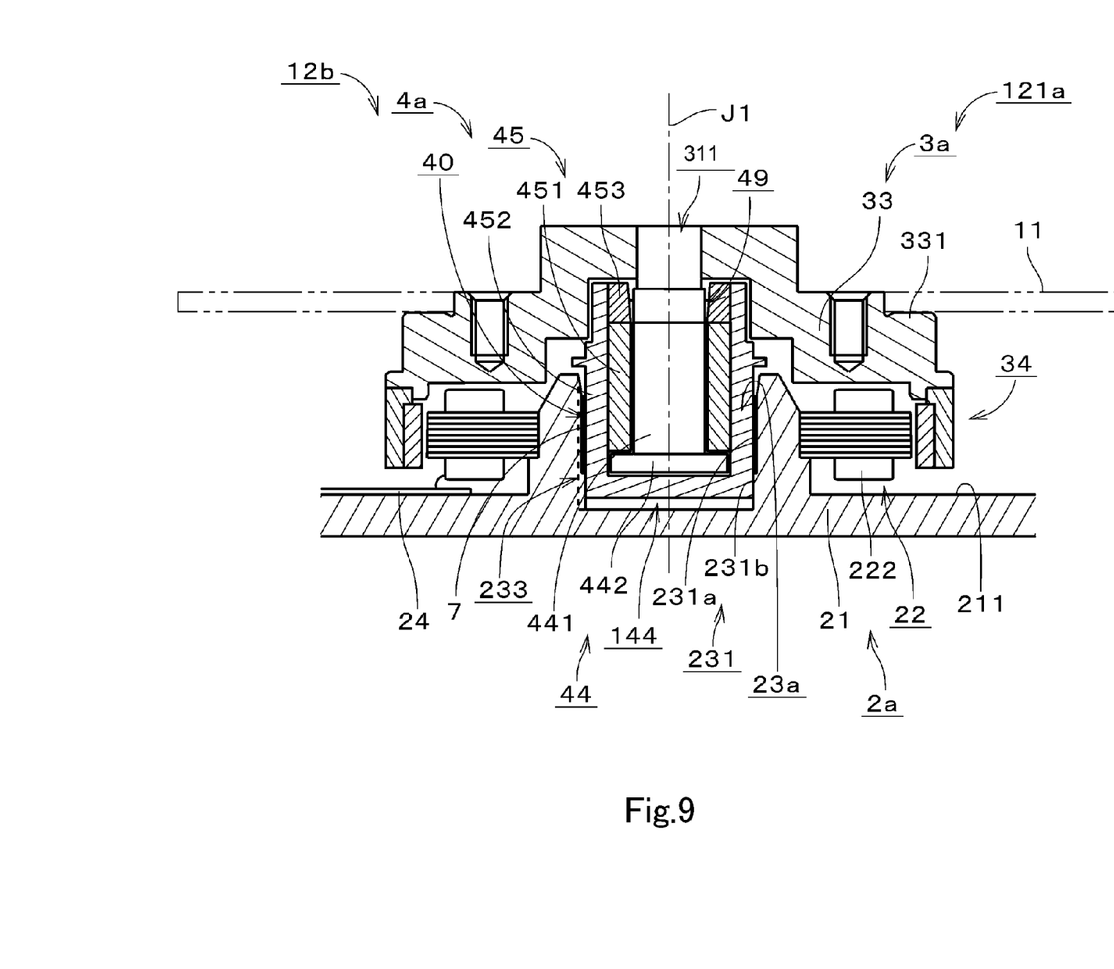
FIG. 9 is a diagram illustrating a motor according to a third preferred embodiment of the present invention.

FIG. 9 is a diagram illustrating a motor 12b according to a third preferred embodiment of the present invention. The motor 12b includes a stationary portion 2a, a rotating portion 3a, and a bearing mechanism 4a. The stationary portion 2a includes the base plate 21, the stator 22, and the wiring 24. The base plate 21 includes a large recessed portion 23a defined therein. More specifically, the recessed portion 23a is defined on the side of the base plate 21 where the interior space 143 of the housing 14 illustrated in FIG. 1 is defined. The structure of the stationary portion 2a is otherwise similar to that of the stationary portion 2 illustrated in FIG. 2.

The opening-side region of the inner side surface 231 of the recessed portion 23a is the adhesion region 231a, while a region on the lower side of the adhesion region 231a is the press-fit region 231b. The axial dimension of the press-fit region 231b is preferably in the range of about 10% to about 50% of the axial dimension of the adhesion region 231a, for example. A portion of the bearing mechanism 4a which is arranged inside the recessed portion 23a (hereinafter referred to as a "lower portion 40" of the bearing mechanism 4a) is fixed to the base plate 21 at the adhesion region 231a and the press-fit region 231b through adhesion and press fitting, respectively. The inner side surface 231 of the recessed portion 23a includes a groove 233 extending in the vertical direction defined therein.

The rotating portion 3a includes a rotor hub 33 and a magnetic member 34. An outer edge portion of the rotor hub 33 includes a disk mount portion 331 on which a disk 11, which is represented by a chain double-dashed line in FIG. 9, is mounted. The magnetic member 34 is substantially similar to the magnetic member 32 illustrated in FIG. 2.

The bearing mechanism 4a includes a shaft portion 44 and a sleeve portion 45. The sleeve portion 45 is substantially cylindrical and includes a bottom. The shaft portion 44 preferably includes a shaft 441 and a thrust plate 442, which is fixed to an end of the shaft 441. The sleeve portion 45 includes a sleeve 451, a sleeve housing 452, and a seal cap 453. The sleeve 451 is preferably made of a porous sintered metal. The sleeve housing 452 is cylindrical and includes a bottom. The shaft 441 is inserted in the sleeve 451. The sleeve 451 is inserted in the sleeve housing 452. The lubricating oil 49, with which the sleeve 451 is impregnated, is held by the sleeve housing 452. The seal cap 453 is arranged on an upper side of the sleeve 451. Note that the sleeve housing 452 and the sleeve 451 may be defined by a single member, for example.

In the motor 12b, a fluid dynamic pressure is generated through the lubricating oil 49 in a gap between the shaft portion 44 and the sleeve portion 45. The rotating portion 3a is thereby supported through the bearing mechanism 4a to be rotatable about the central axis J1 with respect to the stationary portion 2a. A space 144 defined between the sleeve housing 452 and the recessed portion 23a is arranged to be in communication with the interior space 143 of the housing 14 through the groove 233.

When the motor 12b is assembled, first, the stationary portion 2a is assembled, and the rotating portion 3a and the bearing mechanism 4a are assembled as a single assembly 121a (steps S11 and S12). Next, referring to FIG. 10, the thermosetting adhesive 7 is applied to a portion of the adhesion region 231a of the recessed portion 23a which is in the vicinity of the opening end of the recessed portion 23a (step S13). Note that the adhesive 7 may be applied to an outside surface 462 of the sleeve housing 452, that is, to an outside surface of the lower portion 40 of the bearing mechanism 4a. Also note that the adhesive 7 may be applied to both the outside surface 462 and the adhesion region 231a.

Figure 10:
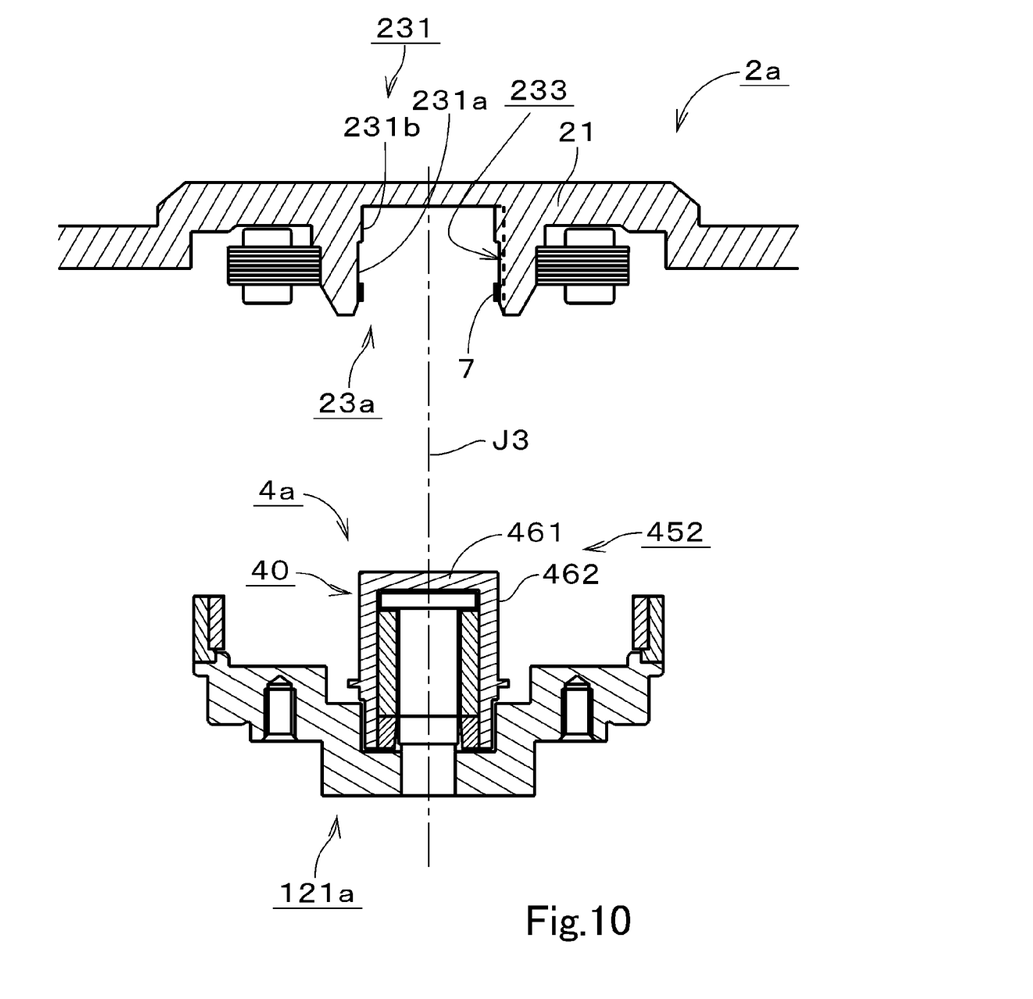
FIG. 10 is a diagram illustrating the motor in course of assemblage thereof.

Then, the lower portion 40 of the bearing mechanism 4a is moved along the central axis J3 to be inserted into the recessed portion 23a. At this time, a portion of the outside surface 462 of the sleeve housing 452 which is near a bottom portion 461 of the sleeve housing 452 is press fitted to the press-fit region 231b, so that the bearing mechanism 4a is temporarily fixed to the base plate 21 (step S14). At the time of the insertion of the sleeve housing 452, air between the recessed portion 23a and the bottom portion 461 of the sleeve housing 452 is discharged through the groove 233, which is defined in the inner side surface 231 of the recessed portion 23a and is arranged to extend in the vertical direction.

Next, the inclination and the height of the disk mount portion 331 are measured, and it is determined whether each of the inclination and the height of the disk mount portion 331 falls within a predetermined allowable range (step S15). That is, it is determined whether each of the perpendicularity and the axial position of the shaft 41 fall within a predetermined allowable range. If both the inclination and the height of the disk mount portion 331 fall within their respective predetermined allowable ranges, the adhesive 7 is cured in the heating device, so that the bearing mechanism 4a is finally fixed to the base plate 21 (step S17).

If either the inclination or the height of the disk mount portion 331 deviates from the predetermined allowable range, that is, if either the perpendicularity or the axial position of the shaft 41 deviates from the predetermined allowable range, the inclination and/or the height of the disk mount portion 331 are corrected so that both the inclination and the height of the disk mount portion 331 with reference to the base plate 21 fall within their respective predetermined allowable ranges (step S16). As a result, the perpendicularity and/or the axial position of the shaft 41 are corrected. Thereafter, if it is confirmed at step S15 that both the inclination and the height of the disk mount portion 331 with reference to the base plate 21 fall within their respective predetermined allowable ranges, the adhesive 7 is cured in the heating device, so that the bearing mechanism 4a is finally fixed to the base plate 21 (step S17).

In the third preferred embodiment, the sleeve housing 452 is fixed to the recessed portion 23a of the base plate 21, whereby a leakage of the helium gas is prevented. As in each of the first and second preferred embodiments, the temporary fixing of the stationary portion 2a and the assembly 121a to each other facilitates an operation of assembling the motor 12b. Because the axial dimension of the adhesion region 231a is arranged to be greater than that of the press-fit region 231b, the adjustment operation for the rotating portion 3a can be easily carried out. Because there is only one press-fit region 231b, the adjustment operation for the rotating portion 3a can be carried out more easily.

Providing the groove 233 in the recessed portion 23a contributes to preventing an excessive increase in air pressure in the space 144 when the bearing mechanism 4a is inserted into the recessed portion 23a. Moreover, it is possible to remove the air from the space 144 through the groove 233 when the helium gas is filled into the interior of the housing 14. Note that, in place of the groove 233, a groove extending in the vertical direction may alternatively be defined in the outside surface 462 of the sleeve housing 452, that is, in an outside surface of the bearing mechanism 4a.

Also note that the adhesive 7 may be applied to the outside surface of the bearing mechanism 4a or the inner side surface 231 of the recessed portion 23a such that one circumferential position is free of the adhesive 7, without the groove 233 being defined. In other words, the adhesive 7 may be applied thereto substantially in the shape of the letter "C" in a plan view such that the air will be discharged out of the space 144 when the bearing mechanism 4a is inserted into the recessed portion 23a. Even in this case, the viscosity of the adhesive 7 is decreased when the adhesive 7 is cured, so that the adhesive 7 is spread to assume an annular shape around an outer circumference of the bearing mechanism 4a.

While preferred embodiments of the present invention have been described above, the present invention is not limited to the above-described preferred embodiments, but a variety of modifications are possible. For example, the adhesion region 231a of the inner side surface 231 of the recessed portion 23 or 23a may be arranged on a lower side of the press-fit region 231b in a modification of any of the above-described preferred embodiments. The shaft 41 may be temporarily fixed to the recessed portion 23 of the base plate 21 by being press fitted thereto through shrink fitting in a modification of the first preferred embodiment. Similarly, the annular member 47 and the sleeve housing 452 may be temporarily fixed to the recessed portions 23 and 23a through shrink fitting in modifications of the second and third preferred embodiments, respectively. Also, the annular member 47 may be adhered to the shaft 41 in a modification of the second preferred embodiment.

Figure 11:
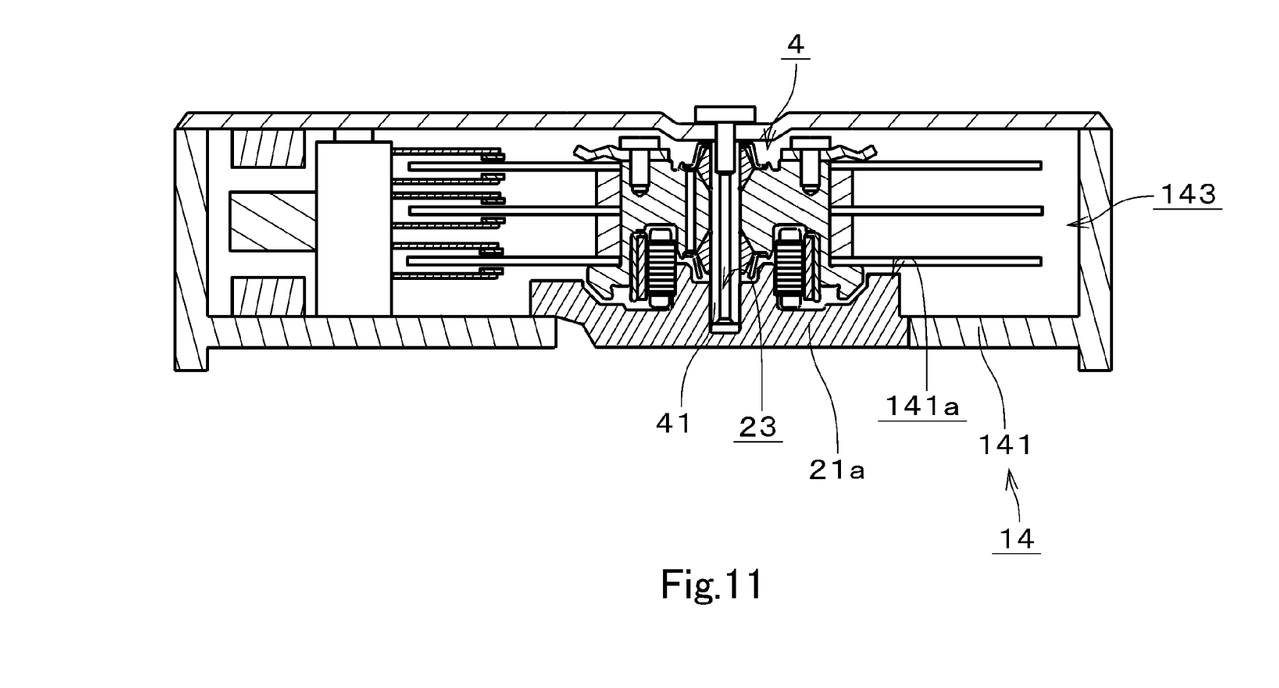
FIG. 11 is a diagram illustrating a motor according to another preferred embodiment of the present invention.

Referring to FIG. 11, a base portion 21a of a bracket type may be used in a modification of the first preferred embodiment. The base portion 21a is fitted to a hole portion 141a defined in a first housing member 141 which is in the shape of a box without a lid, such that the interior space 143 of the housing 14 is sealed between the base portion 21a and the hole portion 141a. Even in this case, the base portion 21a can be considered to define a portion of the housing 14 defining the interior space 143 hermetically enclosed. Also in the case of FIG. 11, the shaft 41 of the bearing mechanism 4 is fixed to the recessed portion 23 of the base portion 21a, and therefore, a leakage of the helium gas through a gap between the base portion 21a and the shaft 41 is prevented. Note that a base portion of the bracket type may also be used in a modification of any other preferred embodiment described above.

The above-described technique of fixing the lower portion of the bearing mechanism to the recessed portion of the base portion is applicable to a variety of disk drive apparatuses each of which has a housing that defines an airtight interior space. In a motor according to a modification of any of the above-described preferred embodiments, the lead wires 222a drawn from the coils 222 may be directly connected to the connector 161 while defining a wiring extending on the inner bottom surface 211 of the base plate 21 toward the connector 161.

Note that features of the above-described preferred embodiments and the above-described modifications thereof may be combined as appropriate as long as no conflict arises.

Various preferred embodiments of the present invention are preferably applicable to spindle motors for use in disk drive apparatuses, and have considerable utility and high industrial applicability.

Only selected preferred embodiments have been chosen to illustrate the present invention. To those skilled in the art, however, it will be apparent from the foregoing disclosure that various changes and modifications can be made herein without departing from the scope of the present invention as defined in the appended claims. Furthermore, the foregoing description of the preferred embodiments according to the present invention is provided for illustration only, and not for limiting the invention as defined by the appended claims and their equivalents. The scope of the present invention, therefore, is to be determined solely by the following claims.

What is claimed is:

1. A spindle motor for use in a disk drive apparatus, the motor comprising:
    a stationary portion;
    a bearing mechanism attached to the stationary portion; and
    a rotating portion supported through the bearing mechanism to be rotatable about a central axis with respect to the stationary portion; wherein
    the stationary portion includes:
        a base portion;
        a stator fixed to the base portion; and
        a wiring arranged to extend from coils of the stator;
    the wiring is arranged along a surface of the base portion which faces an interior space;
    the base portion includes a recessed portion defined on a side thereof where the interior space is defined, the recessed portion including a closed bottom;
    the recessed portion includes an inner side surface including an adhesion region and a press-fit region; and
    a lower portion of the bearing mechanism is fixed to the adhesion region through an adhesive, and press fitted to the press-fit region, and an axial dimension of the adhesion region is greater than an axial dimension of the press-fit region.

2. The spindle motor according to claim 1, wherein the axial dimension of the press-fit region is within a range of about 10% to less than 50% of the axial dimension of the adhesion region.

3. The spindle motor according to claim 1, wherein only one single press-fit is provided in the spindle motor.

4. The spindle motor according to claim 1, wherein the adhesion region is arranged on a side of the press-fit region closer to an opening end of the recessed portion.

5. The spindle motor according to claim 1, wherein the adhesive on the adhesion region is a thermosetting adhesive.

6. The spindle motor according to claim 1, wherein the bearing mechanism includes:
    a sleeve portion; and
    a shaft portion inserted in the sleeve portion; and
    the shaft portion is fixed inside the recessed portion through press fitting and adhesion.

7. The spindle motor according to claim 6, wherein the shaft portion includes:
    a shaft inserted in the sleeve portion; and
    an annular member fixed to an outside surface of a lower portion of the shaft; and
    the annular member is fixed inside the recessed portion through press fitting and adhesion.

8. The spindle motor according to claim 6, wherein a lower end portion of the shaft portion is arranged to be spaced from a bottom surface of the recessed portion.

9. The spindle motor according to claim 6, wherein the shaft portion includes a through hole extending along the central axis.

10. The spindle motor according to claim 1, wherein the inner side surface of the recessed portion includes a groove extending in a vertical direction defined therein.

11. A disk drive apparatus comprising:
    the spindle motor of claim 1;
    an access portion arranged to read and/or write information from or to a disk;
    a clamper arranged to clamp the disk to the spindle motor; and
    a housing arranged to contain the disk, the spindle motor, the access portion, and the damper, the base portion of the spindle motor defining a portion of the housing.

12. The disk drive apparatus according to claim 11, wherein an interior space of the housing is filled with one of a helium gas, a hydrogen gas, a mixture of the helium gas and the hydrogen gas, and a mixture of air and any one of the helium gas, the hydrogen gas, and the mixture of the helium gas and the hydrogen gas.

* * * * *